No. 885,252. PATENTED APR. 21, 1908.
N. HUGHES.
SHOE FOR RAKES.
APPLICATION FILED AUG. 28, 1907.
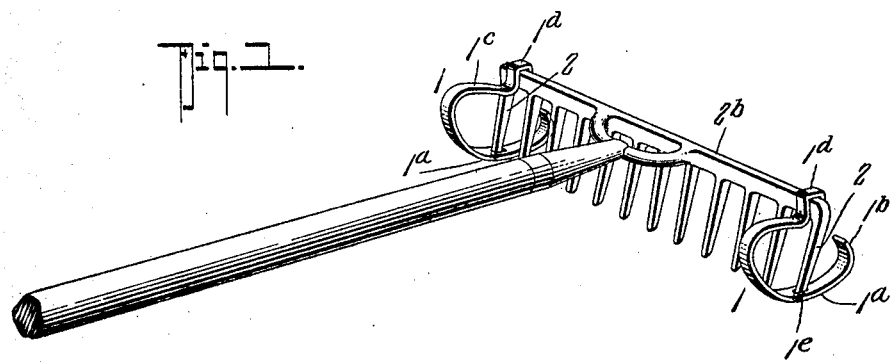
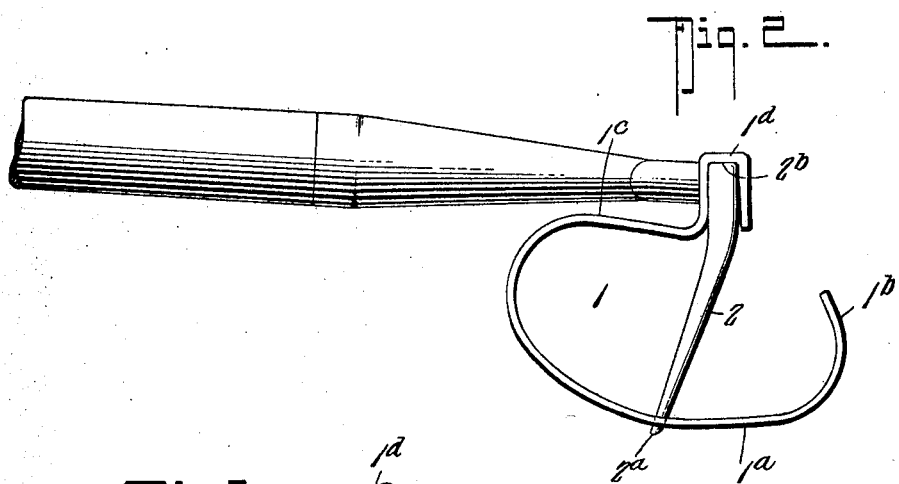
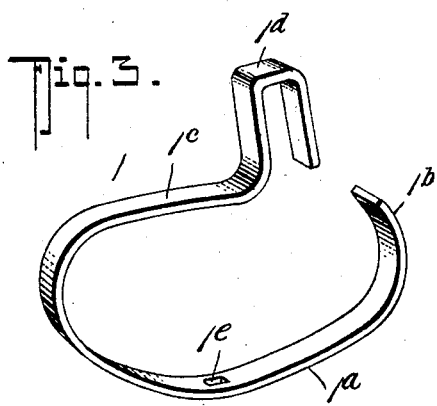
Inventor
Nelson Hughes
Witnesses
O. W. Holmes
John T. Schrott
By Fred G. Dieterich & Co
Attorneys

UNITED STATES PATENT OFFICE.

NELSON HUGHES, OF PORTLAND, OREGON, ASSIGNOR TO HUGHES MANUFACTURING COMPANY, OF PORTLAND, OREGON, A CORPORATION.

SHOE FOR RAKES.

No. 885,252.　　　Specification of Letters Patent.　　　Patented April 21, 1908.

Application filed August 28, 1907. Serial No. 390,546.

*To all whom it may concern:*

Be it known that I, NELSON HUGHES, residing at Portland, in the county of Multnomah and State of Oregon, have invented certain new and useful Improvements in Shoes for Rakes, of which the following is a specification.

My invention relates to certain new and useful improvements in runners or shoes for rakes and the like, and it primarily has for its object to provide a device of this character of a very simple and effective construction capable of ready attachment to the ordinary type of lawn rake.

My invention also provides a runner of this type of a very simple and effective construction which can be easily and cheaply manufactured and which will readily and effectively serve its intended purposes.

Generically, the invention comprises a clip to set over the head of a rake, a spring portion which forms the shoe or runner proper, and a seat or recess in the runner to receive the end of the rake tooth, the clip and the seat or recess forming the means for securing the runner to the rake and holding it in place.

By this construction of runner, the same can be easily attached or removed from the ordinary type of rake and when in operation it will carry the rake smoothly and evenly over the lawn, raising it sufficiently to prevent the rake teeth from engaging the roots of the grass, etc.

With other objects in view than have been heretofore specified, the invention also comprises certain novel construction of shoe, the parts of which will be first described in detail and then be specifically pointed out in the appended claims, reference being had to the accompanying drawing, in which:—

Figure 1, is a perspective view of my invention as applied for use. Fig. 2, is a side elevation thereof on an enlarged scale. Fig. 3, is a perspective view of one of the runners detached.

Referring now to the accompanying drawing, in which like letters and numerals indicate like parts in all of the figures, 1 designates a spring metal member bent into a curve shape to form ground engaging runner portions $1^a$, terminating at one end in a slightly coiled end $1^b$ and at the other end merging with the portion $1^c$, bent back toward the end $1^b$, which portion terminates in a substantially inverted U-shaped clip $1^d$, as shown more clearly in Fig. 3. The ground engaging portion $1^a$ of the runner has a seat or recess $1^e$ to receive the point $2^a$ of the rake tooth 2, while the clip $1^c$ fits over the back bar $2^b$ of the rake.

In applying my improved runner to the rake, the clip $1^c$ is first passed over the bar $2^b$ of the rake and then the runner is sprung over the tooth of the rake until the point $2^a$ enters the recess $1^e$, thus holding the runner on the rake ready for use.

From the foregoing description taken in connection with the accompanying drawing, it is thought the complete construction, operation and many advantages of my invention will be readily understood by those skilled in the art to which it appertains.

What I claim, is:—

1. A runner for rakes comprising a ground engaging portion having a tooth receiving recess and a portion bent back and terminating in a rake bar engaging clip.

2. The combination with a rake, of a runner detachably secured to the back bar thereof and under the point of the rake tooth, substantially as shown and described.

3. A runner comprising a ground engaging portion $1^a$, a curved end $1^b$, a curved back portion $1^c$ terminating in a U-shaped rake engaging clip, substantially as shown and described.

4. A runner comprising a ground engaging portion $1^a$, a curved end $1^b$, a curved back portion $1^c$ terminating in a U-shaped rake engaging clip, said ground engaging portion having a tooth point receiving recess substantially as shown and described.

5. As a new article of manufacture, a runner for rakes composed of a single piece of spring metal bent into curved form and including a ground engaging portion having a rake tooth receiving recess, a curved up and back portion terminating in a U-shaped rake bar engaging clip, substantially as shown and described.

NELSON HUGHES.

Witnesses:
　GEO. W. BRENNER,
　A. T. LEWIS.